United States Patent
Wan et al.

(10) Patent No.: US 12,206,863 B2
(45) Date of Patent: Jan. 21, 2025

(54) METHOD FOR PICTURE DECODING, METHOD FOR PICTURE ENCODING, DECODER, AND ENCODER USING FLAG ENABLED CROSS-DECODING FUNCTION

(71) Applicant: GUANGDONG OPPO MOBILE TELECOMMUNICATIONS CORP., LTD., Guangdong (CN)

(72) Inventors: Shuai Wan, Guangdong (CN); Yanzhuo Ma, Guangdong (CN); Junyan Huo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/457,705

(22) Filed: Aug. 29, 2023

(65) Prior Publication Data
US 2023/0403400 A1  Dec. 14, 2023

Related U.S. Application Data

(63) Continuation of application No. 17/646,673, filed on Dec. 30, 2021, now Pat. No. 11,785,225, which is a
(Continued)

(51) Int. Cl.
| H04N 19/157 | (2014.01) |
|---|---|
| H04N 19/146 | (2014.01) |
| H04N 19/186 | (2014.01) |

(52) U.S. Cl.
CPC ......... *H04N 19/157* (2014.11); *H04N 19/146* (2014.11); *H04N 19/186* (2014.11)

(58) Field of Classification Search
CPC .. H04N 19/157; H04N 19/146; H04N 19/186; H04N 19/103; H04N 19/46;
(Continued)

(56) References Cited

U.S. PATENT DOCUMENTS

| 2008/0123971 A1 | 5/2008 | Fukuzawa |
| 2008/0123972 A1 | 5/2008 | Sekiguchi et al. |

(Continued)

FOREIGN PATENT DOCUMENTS

| CN | 101867820 B | 5/2013 |
| CN | 103096051 A | 5/2013 |

(Continued)

OTHER PUBLICATIONS

Bross Benjamin et al: "Versatile Video Coding (Draft3)" JVET-L1001-v9, Oct. 3-12, 2018. 233 pages.
(Continued)

*Primary Examiner* — Marnie A Matt
(74) *Attorney, Agent, or Firm* — Perkins Coie LLP

(57) ABSTRACT

A method for picture decoding, a method for picture encoding, a decoder, and an encoder are provided. The method includes the following. A bitstream corresponding to a current picture is acquired. The bitstream is parsed to obtain a flag corresponding to the current picture. A cross-decoding function is disabled when a decoding manner indicated by the flag is independent decoding of colour components, where the cross-decoding function allows decoding based on a dependency relationship between two chroma components. The cross-decoding function is enabled when the decoding manner indicated by the flag is cross-decoding of colour components. The current picture is decoded in a direct mode (DM).

12 Claims, 7 Drawing Sheets

Related U.S. Application Data continuation of application No. 17/326,310, filed on May 20, 2021, now Pat. No. 11,272,186, which is a continuation of application No. PCT/CN2019/078195, filed on Mar. 14, 2019.

(60) Provisional application No. 62/790,795, filed on Jan. 10, 2019.

(58) Field of Classification Search
CPC .... H04N 19/70; H04N 19/122; H04N 19/124; H04N 19/176; H04N 19/436; H04N 19/159
USPC ..................................................... 375/240.13
See application file for complete search history.

(56) References Cited

U.S. PATENT DOCUMENTS

| | | | |
|---|---|---|---|
| 2008/0170615 | A1 | 7/2008 | Sekiguchi et al. |
| 2009/0080534 | A1* | 3/2009 | Sekiguchi ............ H04N 19/152 375/E7.027 |
| 2014/0098862 | A1 | 4/2014 | Yang et al. |
| 2014/0233641 | A1 | 8/2014 | Yang et al. |
| 2015/0382016 | A1 | 12/2015 | Cohen et al. |
| 2017/0070735 | A1 | 3/2017 | Ramasubramonian et al. |
| 2017/0118466 | A1 | 4/2017 | Nakagami |
| 2017/0195676 | A1 | 7/2017 | Chuang et al. |
| 2018/0205949 | A1 | 7/2018 | Hsiang |

FOREIGN PATENT DOCUMENTS

| | | |
|---|---|---|
| CN | 106576164 A | 4/2017 |
| CN | 106576176 A | 4/2017 |
| CN | 108322760 A | 7/2018 |
| GB | 2498982 A | 8/2013 |
| JP | 2009017472 A | 1/2009 |
| JP | 2014522193 A | 8/2014 |
| JP | 2014209757 A | 11/2014 |
| JP | 2016519898 A | 7/2016 |
| RU | 2324302 C1 | 5/2008 |
| WO | 2007034601 A1 | 3/2007 |
| WO | 2015198954 A1 | 12/2015 |

OTHER PUBLICATIONS

Choi(Samsung)N et al: "CE3-related: Chroma DM modification", JVET-L0053-v2, Oct. 3, 2018. 5 pages.
Examination report issued in corresponding European application No. 19908400.5 dated May 4, 2022. 6 pages.
Extended European search report issued in corresponding European application No. 19908400.5 dated Nov. 24, 2021. 9 pages.
First Examination Report issued in corresponding CA application No. 3121922 dated Sep. 22, 2022. 4 pages.
First Examination Report issued in corresponding IN application No. 202117016584 dated Aug. 16, 2022 (6 pages).
JCTVC-N0224_r1, Jie Dong et al.; "SEI message: post filters to enhance the chroma planes", 14th Meeting: Vienna, AT, Jul. 25-Aug. 2, 2013. (9 pages.).
Jeeyoon Park(Skku)et al: "CE3-related: Modified Chroma Intra Mode Coding", JVET-M0324, Jan. 2, 2019. 6 pages.
Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0042 (Year: 2018).
Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0427 (Year: 2018).
Joint Video Experts Team (JVET) of ITU-T SG 16 WP 3 and ISO/IEC JTC 1/SC 29/WG 11 13th Meeting: Marrakech, MA, Jan. 9-18, 2019 Document: JVET-M0213 (Year: 2019).
JVET-L329-v1, K. Zhang et al: "CE3-related: CCLM prediction with single-line neighbouring luma samples", 12th Meeting: Macao, CN, Oct. 3-12, 2018. (3 pages.).
Non-Final Office Action issued Dec. 15, 2022 of U.S. Appl. No. 17/646,673, filed Dec. 30, 2021.
Non-Final Office Action issued Jul. 26, 2021 of U.S. Appl. No. 17/326,310, filed May 20, 2021.
Non-Final Office Action issued Mar. 3, 2023 of U.S. Appl. No. 17/646,673, filed Dec. 30, 2021.
Notice of Allowance for U.S. Appl. No. 17/326,310 issued Nov. 4, 2021. 10 pages.
Notice of Allowance issued May 31, 2023 of U.S. Appl. No. 17/646,673, filed Dec. 30, 2021.
Notice of Reasons for Refusal issued in corresponding JP Application No. 2021-530947 dated Apr. 12, 2023. (18 pages with English translation).
Office Action issued in corresponding ID Application No. P00202104400 dated Apr. 12, 2023. (6 pages with English translation).
Office Action issued in corresponding RU application No. 2021117816 dated Jun. 20, 2022 (21 pages).
The first office action issued in corresponding CN application No. 202110352754.3 dated Apr. 12, 2022. 15 pages with English translation.
Naccari M et al: "HEVC Range Extensions Test Model 6 Encoder Description", 16th JCT-VC Meeting; from Jan. 9, 2014 to Jan. 17, 2014; San Jose; (Joint Collaborative Team on Video Coding of ISO/IEC JTC1/SC29/WG11 and ITU-T SG.16 ); JCTVC-P1013. 20 pages.
Summons to attend oral proceedings pursuant to Rule 115(1) EPC issued in corresponding European application No. 19908400.5 dated Jan. 31, 2023. 9 pages.
International Search Report and Written Opinion for Application No. PCT/CN2019/078195 issued Oct. 8, 2019. 13 pages.
Examiner Interview Summary Record (PTOL-413) issued in corresponding U.S. Appl. No. 17/326,310 dated Oct. 4, 2021.
Corrected Notice of Allowability issued Aug. 2, 2023 of of U.S. Appl. No. 17/646,673, filed Dec. 30, 2021.
Notice of Deficiencies for Patent issued in corresponding IL application No. 283477 dated Sep. 28, 2023. (4 pages).
Notice of Reasons for Refusal issued in corresponding JP Application No. 2021-530947 dated Sep. 1, 2023. (18 pages with English translation).
Examination report No. 1 for standard patent application issued in corresponding AU application No. 2019420838 dated Jul. 25, 2024. 3 pages.
First Substantive Examination—Adverse Report issued in corresponding PI application No. 2021003074 dated Feb. 2, 2024. (4 pages).
Notice of Preliminary Rejection issued in corresponding KR application No. 10-2021-7016139 dated Nov. 11, 2024. 11 pages (with English translation).

* cited by examiner

METHOD FOR PICTURE DECODING, METHOD FOR PICTURE ENCODING, DECODER, AND ENCODER USING FLAG ENABLED CROSS-DECODING FUNCTION

CROSS-REFERENCE TO RELATED APPLICATION(S)

This application is a continuation of U.S. Non-Provisional application Ser. No. 17/646,673, filed on Dec. 30, 2021, which is a continuation of U.S. Non-provisional application Ser. No. 17/326,310, filed on May 20, 2021, now U.S. Pat. No. 11,272,186, issued on Mar. 8, 2022, which is a continuation of International Application No. PCT/CN2019/078195, filed on Mar. 14, 2019, which claims priority to U.S. Provisional Application No. 62/790,795, filed on Jan. 10, 2019, the entire disclosures of which are incorporated herein by reference.

TECHNICAL FIELD

This disclosure relates to the technical field of video coding, and particular to a method for picture decoding, a method for picture encoding, a decoder, and an encoder.

BACKGROUND

In the next-generation video coding standard H.266 or versatile video coding (VVC), cross-component dependency is allowed. Thus, prediction from the luma value to the chroma value or prediction between the chroma values can be achieved through cross-component linear model prediction (CCLM) and direct mode (DM).

Although CCLM and other cross-component dependency coding (i.e., encoding/decoding) modes can improve coding efficiency, for scenes that require fast processing or high parallel processing, the cross-component dependency coding mode is unable to be effectively used for parallel coding and has a defect of high complexity.

SUMMARY

In a first aspect, a method for picture decoding is provided. The method includes the following.

A bitstream corresponding to a current picture is acquired. The bitstream is parsed to obtain a flag corresponding to the current picture. A cross-decoding function is disabled when a decoding manner indicated by the flag is independent decoding of colour components, where the cross-decoding function allows decoding based on a dependency relationship between two chroma components. The cross-decoding function is enabled when the decoding manner indicated by the flag is cross-decoding of colour components. The current picture is decoded in a direct mode (DM).

In a second aspect, a method for picture encoding is provided. The method includes the following.

A current picture is acquired. A cross-encoding function is disabled when an encoding manner for the current picture is determined to be independent encoding of colour components, where the cross-encoding function allows encoding based on a dependency relationship between two chroma components. A flag indicating the encoding manner is encoded into a bitstream corresponding to the current picture. The cross-encoding function is enabled when the encoding manner for the current picture is determined to be cross-encoding of colour components. The flag is encoded in a DM.

In a third aspect, a decoder is provided. The decoder includes at least one processor and a memory. The memory is coupled to the at least one processor and configured to store at least one computer executable instruction. When executed by the at least one processor, the at least one computer executable instruction causes the at least one processor to execute the method of the first aspect.

In a fourth aspect, an encoder is provided. The encoder includes at least one processor and a memory. The memory is coupled to the at least one processor and configured to store at least one computer executable instruction. When executed by the at least one processor, the at least one computer executable instruction causes the at least one processor to execute the method of the second aspect.

DETAILED DESCRIPTION

Figure 1:
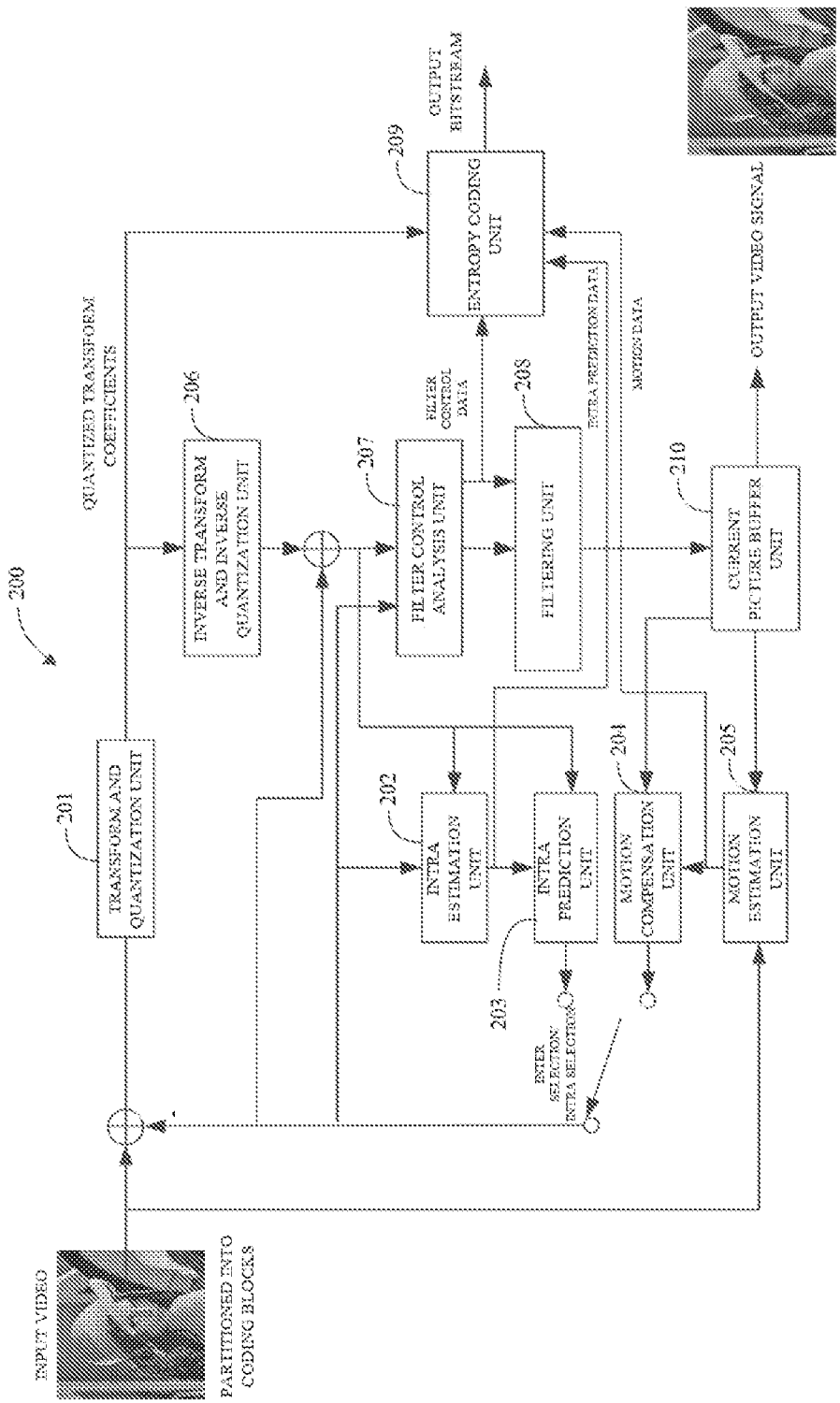
FIG. 1 is a schematic structural diagram of a video encoding system.

The technical solutions in the implementations of this application will be clearly and completely described below in conjunction with the drawings in the implementations of this application. It is understandable that the implementations described herein are only used to explain the relevant application, but not to limit this application. In addition, for ease of description, only parts related to the relevant application are illustrated in the drawings.

To encode a video is to encode each picture; similarly, to decode a video bitstream obtained through video encoding and compression is to decode a bitstream of each picture. In almost all international standards for picture encoding, when encoding one picture, it is necessary to partition the picture into several sub-images of M×M pixel block, which are called coding units (CU), and encode the sub-images block by block, by using the CU as the basic coding unit. M is generally of the value 4, 8, 16, 32, or 64. Therefore, to encode a video sequence is to in turn encode each CU of each picture. To decode a bitstream of a video sequence is to in turn decode each CU of each picture, and finally to reconstruct the entire video sequence.

In the picture, a first colour component, a second colour component, and a third colour component are generally used to indicate a coding block. The first colour component, the second colour component, and the third colour component are respectively a luma component, a blue chroma component, and a red chroma component. For example, the luma component is generally represented by a symbol Y, the blue chroma component is generally represented by a symbol Cb, and the red chroma component is generally represented by a symbol Cr.

In the implementation, the first colour component, the second colour component, and the third colour component are the luma component Y, the blue chroma component Cb, and the red chroma component Cr, respectively. For example, the first colour component is the luma component Y, the second colour component is the red chroma component Cr, and the third colour component is the blue chroma component Cb, which is not limited herein.

In H.266, in order to further improve coding performance and coding efficiency, cross-component prediction (CCP) has been extended and improved. In H.266, CCLM can implement prediction from the first colour component to the second colour component, from the first colour component to the third colour component, and between the second colour component and the third colour component. In other words, the CCLM prediction mode includes: predicting the chroma component by using the luma component (i.e., using the first colour component to predict the second colour component or using the first colour component to predict the third colour component). The CCLM prediction mode also includes prediction between the two chroma components (i.e., prediction between the second colour component and the third colour component). In the implementation of this application, the prediction between the second colour component and the third colour component can include prediction from the Cb component to the Cr component or prediction from the Cr component to the Cb component.

For technologies in the video coding standard such as CCLM and DM that allow cross-component dependency, such tools may be involved in future media coding such as 3D video and point clouds. In these technologies, since the luma component can be used to predict information such as the chroma component, the coding mode, and the residual and prediction between chroma components is also possible, coding efficiency can be greatly improved. However, the cross-component dependency also brings challenges to parallel coding. That is, in some scenes, the dependency (or known as dependency relationship) between the luma component and the chroma component, the dependency between different chroma components (for example, two chroma components), or the dependency between different colour components may not be used, to reduce complexity of coding.

According to the implementations of this application, a flag indicating whether to allow cross coding between different colour components is added into a bitstream, to control use of technologies such as CCLM and DM. As such, a codec can be effectively used for parallel coding and the defect of high coding complexity can be overcome. FIG. 1 is a schematic structural diagram of a video encoding system. As illustrated in FIG. 1, the video encoding system 200 includes a transform and quantization unit 201, an intra estimation unit 202, an intra prediction unit 203, a motion compensation unit 204, a motion estimation unit 205, an inverse transform and inverse quantization unit 206, a filter control analysis unit 207, a filtering unit 208, an entropy coding unit 209, and a current picture buffer unit 210, etc. The filtering unit 208 can implement deblocking filtering and sample adaptive offset (SAO) filtering, and the entropy coding unit 209 can implement header information encoding and context-based adaptive binary arithmetic coding (CABAC).

For an input original video signal, a coding tree unit (CTU) can be obtained through preliminary partition, and by applying content adaptive partitioning to one CTU, CUs can be obtained. The CU generally includes one or more coding blocks (CB). Then, for the residual pixel information obtained after intra prediction or inter prediction, the coding block is transformed by the transform and quantization unit 201, including transforming the residual information from the pixel domain to the transform domain, and the obtained transform coefficients are quantized, to further reduce the bitrate. The intra estimation unit 202 and the intra prediction unit 203 are used to perform intra-predictive coding of the coding block. In an example, the intra estimation unit 202 and the intra prediction unit 203 are used to determine an intra prediction mode to be used to encode the coding block. The motion compensation unit 204 and the motion estimation unit 205 are used to perform inter-predictive coding of the received coding block relative to one or more blocks in one or more reference pictures, to provide temporal prediction information. The motion estimation performed by the motion estimation unit 205 is a process of generating a motion vector, where the motion vector can estimate motion of the coding block. The motion compensation unit 204 is used to perform motion compensation based on the motion vector determined by the motion estimation unit 205. After the intra prediction mode is determined, the intra prediction unit 203 is used to provide the selected intra prediction data to the entropy coding unit 209 and the motion estimation unit 205 is used to send the calculated motion vector data to the entropy coding unit 209. In addition, the inverse transform and inverse quantization unit 206 is used for reconstruction of the coding block. A residual block is reconstructed in the pixel domain, and blockiness artifacts of the reconstructed residual block are removed through the filter control analysis unit 207 and the filtering unit 208, and then the reconstructed residual block is added to a prediction of the picture in the current picture buffer unit 210, to generate a reconstructed coding block. The entropy coding unit 209 is used to encode various encoding parameters and quantized transform coefficients. In the CABAC-based encoding algorithm, the context can be based on neighbouring coding blocks, and the entropy coding unit 209 can be used to encode information indicating the determined intra prediction mode and output the bitstream of the video signal. The current picture buffer unit 210 is used to store reconstructed coding blocks, for prediction reference. As the picture encoding progresses, reconstructed coding blocks will be continuously generated, and these reconstructed coding blocks will be stored into the current picture buffer unit 210.

Figure 2:
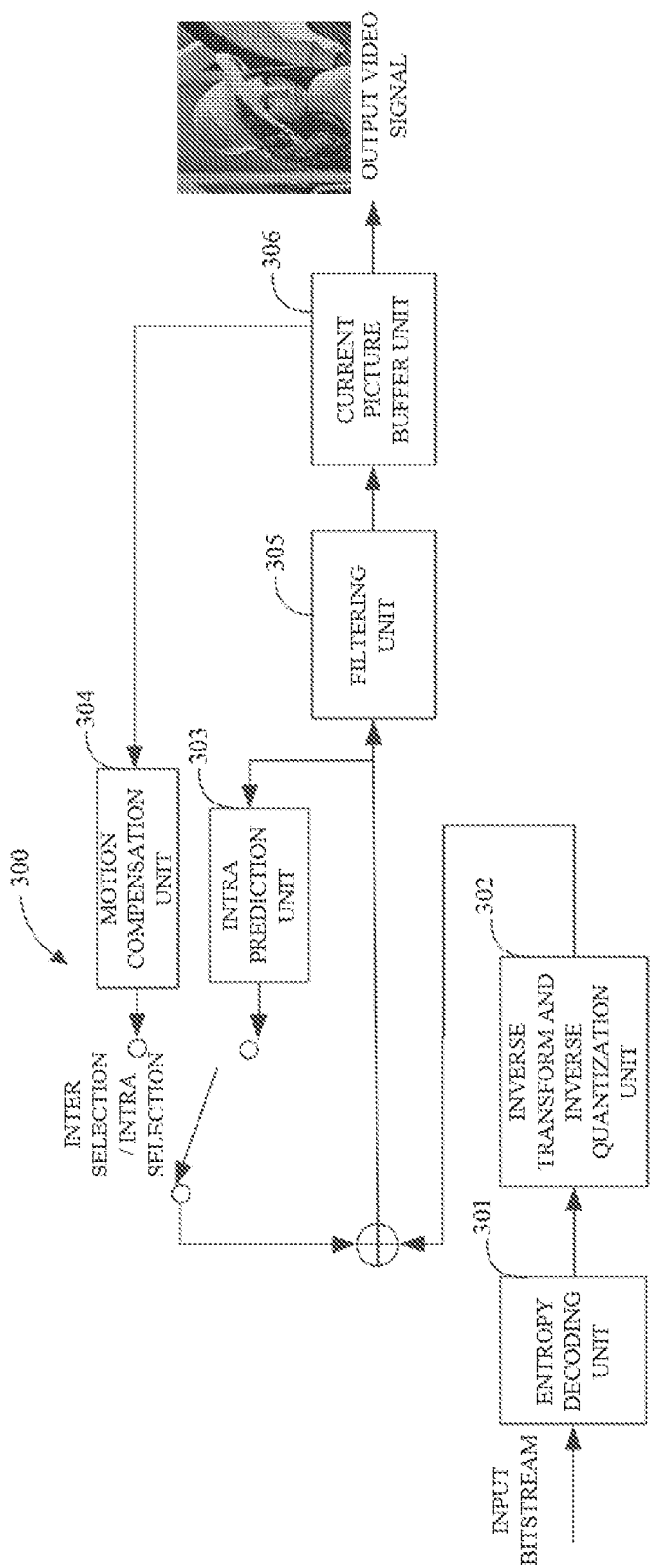
FIG. 2 is a schematic structural diagram of a video decoding system.

FIG. 2 is a schematic structural diagram of a video decoding system. As illustrated in FIG. 2, the video decoding system 300 includes an entropy decoding unit 301, an inverse transform and inverse quantization unit 302, an intra prediction unit 303, a motion compensation unit 304, a filtering unit 305, a current picture buffer unit 306, and the like. The entropy decoding unit 301 can implement header information decoding and CABAC, and the filtering unit 305 can implement deblocking filtering and SAO filtering. After the input video signal is encoded (as illustrated in FIG. 2), the bitstream of the video signal is output. The bitstream is input into the video decoding system 300. First, decoded transform coefficients are obtained through the entropy decoding unit 301. The decoded transform coefficients are processed by the inverse transform and inverse quantization unit 302, so as to generate a residual block in the pixel domain. The intra prediction unit 303 may be used to generate prediction data of the current coding block based on the determined intra prediction mode and data from the previous decoded block of the current frame or picture. The motion compensation unit 304 is used to determine prediction information for the coding block by analyzing motion vectors and other associated syntax elements, and use the prediction information to generate a prediction of the coding block that is being decoded. The decoded block is formed by summing the residual block from the inverse transform and inverse quantization unit 302 and the corresponding prediction generated by the intra prediction unit 303 or the motion compensation unit 304. The blockiness artifacts of the decoded video signal are removed through the filtering unit 305, which can improve quality of the video. The decoded block is then stored into the current picture buffer unit 306. The current picture buffer unit 306 is used to store reference pictures used for subsequent intra prediction or motion compensation, and is also used to output the video signal, that is, the restored original video signal is obtained.

Technical solutions in implementations of this application will be described clearly and completely hereinafter with reference to the accompanying drawings.

Figure 3:
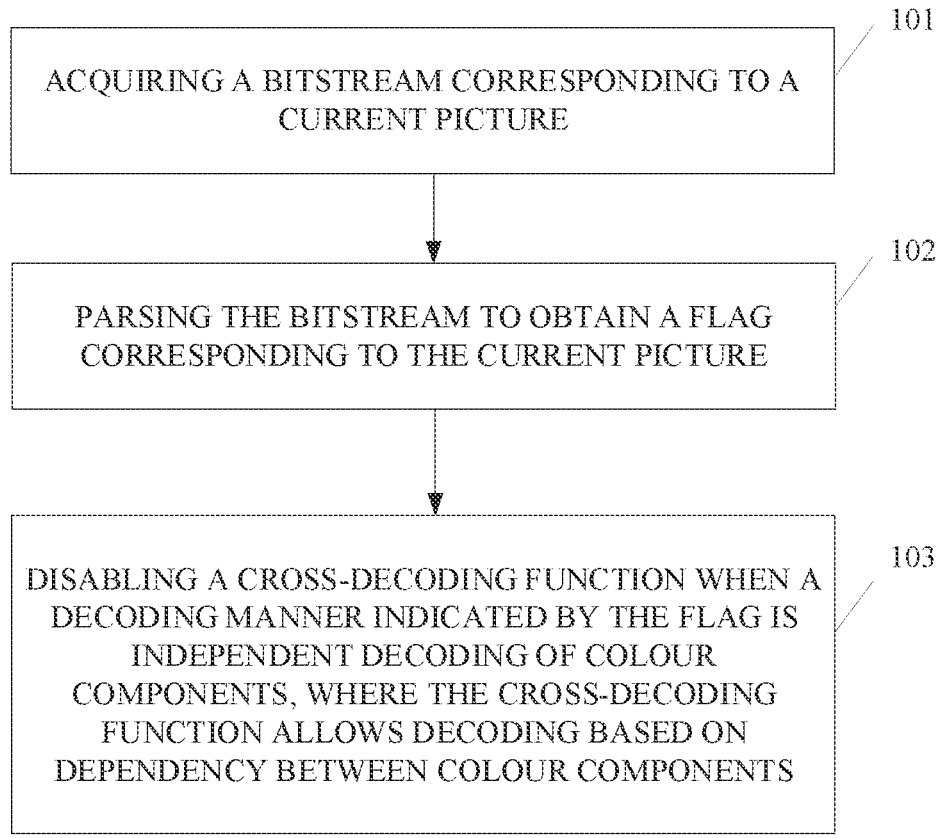
FIG. 3 is a first flowchart of a method for picture decoding according to implementations.

In at least one implementation of this application, a method for picture decoding is provided. FIG. 3 is a first flowchart of a method for picture decoding according to implementations. As illustrated in FIG. 3, in the implementation, the method performed by a decoder begins at block 101.

At block 101, a bitstream corresponding to a current picture is acquired.

In the implementation, the decoder acquires the bitstream corresponding to the current picture.

Furthermore, in the implementation, the bitrate refers to the data traffic that a video file consumes in a unit of time and is an important part of picture quality control in video encoding.

In the implementation, after encoding the current picture, an encoder can generate corresponding bitstream for storage or transmission. Accordingly, when decoding the current picture, the decoder can first receive the bitstream corresponding to the current picture.

At block 102, the bitstream is parsed to obtain a flag corresponding to the current picture.

In the implementation, after acquiring the bitstream corresponding to the current picture, the decoder parses the bitstream to obtain the flag corresponding to the current picture.

In the implementation, the flag can be used to indicate the relationship between different colour components corresponding to the current picture. In an example, in the implementation, different colour components corresponding to the current picture may be dependent on each other or independent of each other.

Furthermore, when encoding the current picture, the encoder can determine the flag based on the relationship between different components in the current picture. For example, if the encoder does not use the dependency between different colour components in the process of encoding the current picture, that is, does not use the dependency between the luma component and the chroma component as well as between different chroma components, the encoder determines the flag in the bitstream as 0. If the encoder uses the dependency between different colour components in the process of encoding the current picture, that is, uses the dependency between the luma component and the chroma component as well as between different chroma components, the encoder determines the flag in the bitstream as 1.

Accordingly, when the decoder parses the bitstream corresponding to the current picture, if the flag in the bitstream obtained through parsing is 1, the decoder determines that the dependency between different colour components needs to be used in the process of decoding the current picture, that is, the dependency between the luma component and the chroma component as well as between different chroma components needs to be used. If the flag in the bitstream obtained through parsing is 0, the decoder determines that the dependency between different colour components does not need to be used in the process of decoding the current picture, that is, the dependency between the luma component and the chroma component as well as between different chroma components does not need to be used.

In the implementation, different colour components corresponding to the current picture may include a first colour component, a second colour component, and a third colour component, that is, include three colour components of Y, Cb, and Cr. Therefore, when the decoder uses the flag to indicate the relationship between different colour components corresponding to the current picture, the flag can not only be used to indicate the mutual dependence or mutual independence among the first colour component, the second colour component, and the third colour component, but also be used to indicate the mutual dependence or mutual independence between at least two of the first colour component, the second colour component, and the third colour component. Furthermore, in the implementation, after the decoder parses the bitstream corresponding to the current picture, the flag obtained after parsing may be located in one or more of a sequence parameter set (SPS), a picture parameter set (PPS), supplemental enhancement information (SEI), a coding tree unit, and a coding unit in the bitstream.

In the H.264/AVC video coding standard, the entire system framework includes two layers, which are a network abstraction layer (NAL) and a video coding layer (VCL). The VCL is responsible for effectively representing contents of video data, and the NAL is responsible for formatting the data and providing header information, to ensure that the data is suitable for transmission on various channels and storage media.

Furthermore, different types of NAL units are specified in the H.264 standard, and different NAL units store different data. In the H.264, the first NAL unit in the bitstream is SPS; the second NAL unit in the bitstream is PPS; the third NAL unit in the bitstream is instantaneous decoding refresh (IDR).

In the implementation, except for SPS and PPS, data corresponding to the picture is a NAL unit.

Furthermore, in the implementation, information in the SPS is very important. If data in the SPS is lost or occurs an error, the decoding is likely to fail. In an example, SPS is also generally used as initialization information of decoder instances in the video processing framework of platforms such as VideoToolBox of iOS.

In the implementation, a set of global parameters of an encoded video sequence is stored in the SPS. The encoded video sequence refers to a sequence composed of encoded pixel data of each picture of the original video. The parameters on which the encoded data of each picture depends are stored in the PPS.

Furthermore, NAL units of SPS and PPS are generally located at the beginning of the entire bitstream. However, in some special cases, these two structures may also locate in the middle of the bitstream. This is because the decoder needs to start decoding in the middle of the bitstream or because the encoder changes the parameters of the bitstream (such as image resolution, etc.) during encoding.

At block 103, a cross-decoding function is disabled when a decoding manner indicated by the flag is independent decoding of colour components, where the cross-decoding function allows decoding based on dependency between colour components.

In the implementation, after the decoder parses the bitstream to obtain the flag corresponding to the current picture, if the decoding manner indicated by the flag is the independent decoding of colour components, the decoder disables the cross-decoding function.

In the implementation, the cross-decoding function allows decoding based on the dependency between colour components, for example, between two chroma components. That is, when the decoder decodes the current picture, the cross-decoding function allows cross-component dependency, i.e., the decoder can decode the current picture through CCLM or DM.

Furthermore, in the implementation, after obtaining the flag in the bitstream through parsing, the decoder can first determine the decoding manner indicated by the flag. In an example, the decoding manner indicated by the flag is the independent decoding of colour components or cross-decoding of colour components.

In the implementation, if the decoding manner indicated by the flag is the independent decoding of colour components, the decoder is unable to use the dependency between different colour components to decode, that is, the decoder needs to perform the independent decoding according to one (type of) colour component. For example, if the flag in the bitstream obtained through parsing of the decoder is 0, it is considered that the encoder does not use the dependency between the luma component and the chroma component as well as between different chroma components in the process of encoding the current picture. As such, it is determined that the decoding manner indicated by the flag is the independent decoding of colour components. Accordingly, the decoder will not use the dependency between the luma component and the chroma component as well as between different chroma components and then decodes the current picture.

In the implementation, when the decoder uses the flag to indicate the relationship between different colour components corresponding to the current picture, the flag can not only be used to indicate the mutual dependence or mutual independence among the first colour component, the second colour component, and the third colour component, but also be used to indicate the mutual dependence or mutual independence between at least two of the first colour component, the second colour component, and the third colour component. Therefore, the decoding manner indicated by the flag may include independent decoding of colour components among the three colour components and cross-decoding of colour components among the three colour components, and may also include independent decoding of colour components between any two colour components and cross-decoding of colour components between any two colour components. For example, when the flag indicates the relationship between the three colour components of Y, Cb, and Cr, if the flag in the bitstream is 1, it can be considered that the encoder has used the dependency between the luma component and the chroma component as well as between different chroma components when encoding the current picture. Accordingly, the decoder will use the dependency between the three different colour components of Y, Cb and Cr. When the flag indicates the relationship between the two colour components of Cb and Cr, if the flag in the bitstream is 0, it can be considered that the encoder does not use the dependency between different chroma components when encoding the current picture. Accordingly, the decoder will not use the dependency between the two colour components of Cb and Cr, but the dependency between colour components of Y and Cb as well as between colour components of Y and Cr will be used.

Figure 4:
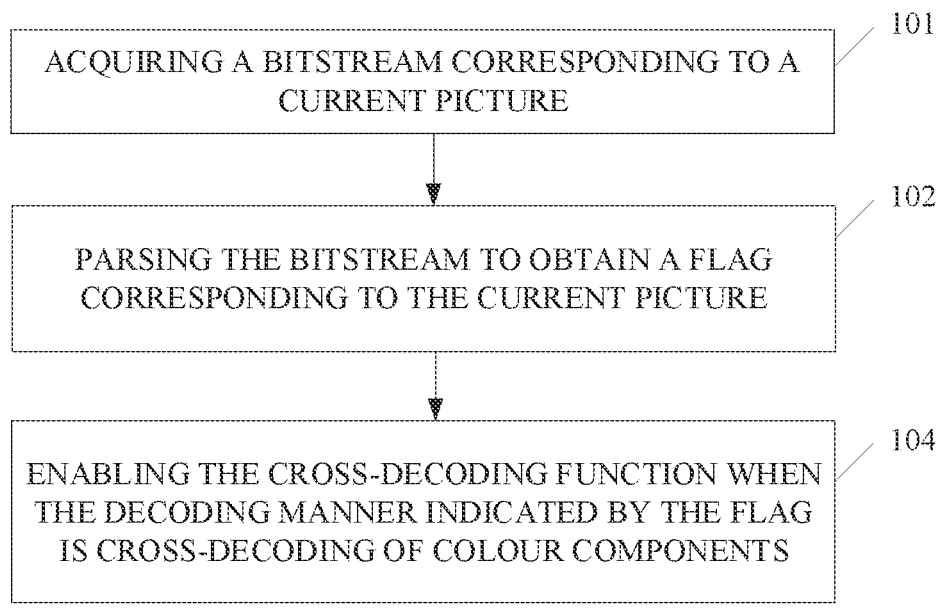
FIG. 4 is a second flowchart of a method for picture decoding according to implementations.

In at least one implementation, furthermore, FIG. 4 is a second flowchart of a method for picture decoding according to implementations. As illustrated in FIG. 4, after the decoder parses the bitstream to obtain the flag corresponding to the current picture (i.e., block 102), the decoder further conducts the following.

At block 104, the cross-decoding function is enabled when the decoding manner indicated by the flag is cross-decoding of colour components.

In the implementation, after the decoder parses the bitstream to obtain the flag corresponding to the current picture, if the decoding manner indicated by the flag is the cross-decoding of colour components, the decoder can enable the cross-decoding function.

In the implementation, after the decoder parses the bitstream to obtain the flag, if the decoding manner indicated by the flag is the cross-decoding of colour components, the decoder can use the dependency between different colour components to decode, that is, the decoder can decode the current picture through CCLM or DM. For example, if the flag in the bitstream obtained through parsing of the decoder is 1, it is considered that the encoder has used the dependency between the luma component and the chroma component as well as between different chroma components in the process of encoding the current picture. As such, it is determined that the decoding manner indicated by the flag is the cross-decoding of colour components. Accordingly, the decoder will use the dependency between the luma component and the chroma component as well as between different chroma components and then decodes the current picture.

Figure 5:
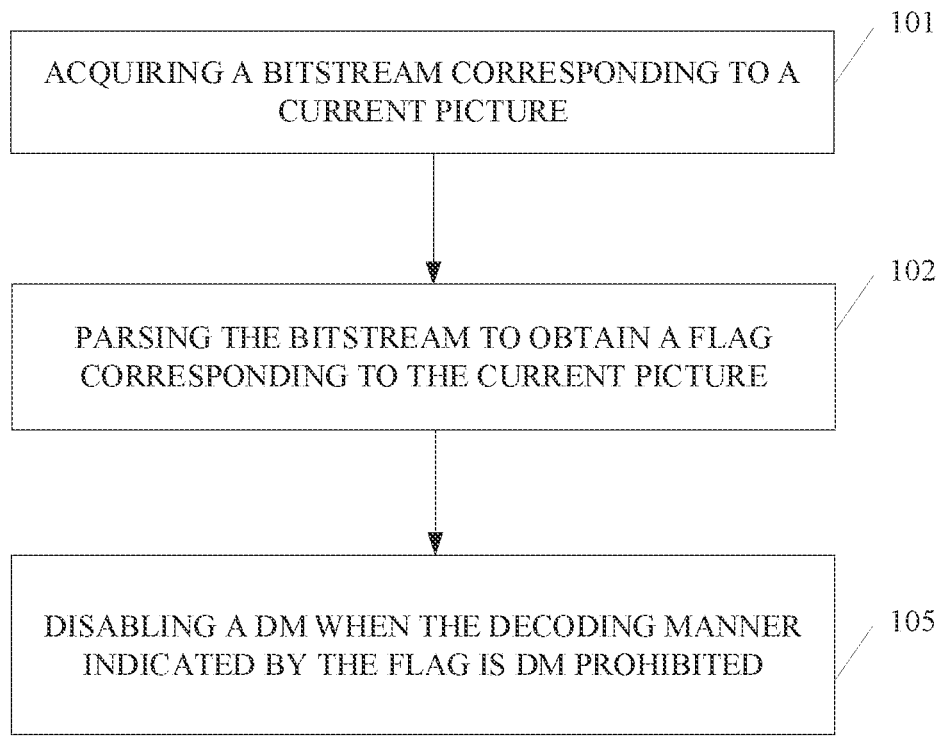
FIG. 5 is a third flowchart of a method for picture decoding according to implementations.

In at least one implementation, furthermore, FIG. 5 is a third flowchart of a method for picture decoding according to implementations. As illustrated in FIG. 5, after the decoder parses the bitstream to obtain the flag corresponding to the current picture (i.e., block 102), the decoder further conducts the following.

At block 105, a DM is disabled when the decoding manner indicated by the flag is DM prohibited.

In the implementation, after the decoder parses the bitstream to obtain the flag corresponding to the current picture, if the decoding manner indicated by the flag is DM prohibited, the decoder can disable the DM.

In the implementation, the flag in the bitstream can indicate "use" or "not use" of the DM technology. In an example, if the decoding manner indicated by the flag is DM prohibited, the decoder needs to disable the DM when decoding the current picture. If the decoding manner indicated by the flag is DM allowed, the decoder needs to enable the DM when decoding the current picture.

Furthermore, in the implementation, the flag in the bitstream can indicate "use" or "not use" of any technology or expression pattern based on dependency between colour components. That is, in the implementation, the flag in the bitstream is not only for control of use of the DM technology, but also a tool for control of use of other technologies based on dependency between colour components, which is not limited herein.

According to the method for picture decoding, the decoder acquires the bitstream corresponding to the current picture; the decoder parses the bitstream to obtain the flag corresponding to the current picture; the decoder disables the cross-decoding function when the decoding manner indicated by the flag is the independent decoding of colour components, where the cross-decoding function allows decoding based on the dependency between colour components. That is, according to the implementation, the decoder may first parse the bitstream corresponding to the current picture to obtain the flag in the bitstream for determining whether to allow dependency between colour components. If the decoding manner indicated by the flag is the independent decoding of colour components (that is, the dependency between colour components is not allowed), the decoder needs to disable the cross-decoding function (that is, the decoder decodes the current picture without relying on the dependency between colour components). As such, parallel coding can be achieved and complexity of coding can be reduced in scenes that require fast processing or high parallel processing. Meanwhile, in these scenes, a bit, which indicates that decoding is not based on the dependency between colour components, can be omitted in the CU layer and coding efficiency can be improved.

Based on the above implementation, in another implementation, the colour components in block 101 to block 103 may include the first colour component, the second colour component, and the third colour component. The first colour component, the second colour component, and the third colour component are the luma component Y, the blue chroma component Cb, and the red chroma component Cr, respectively. For example, the first colour component is the luma component Y, the second colour component is the red chroma component Cr, and the third colour component is the blue chroma component Cb, which is not limited herein.

Figure 6:
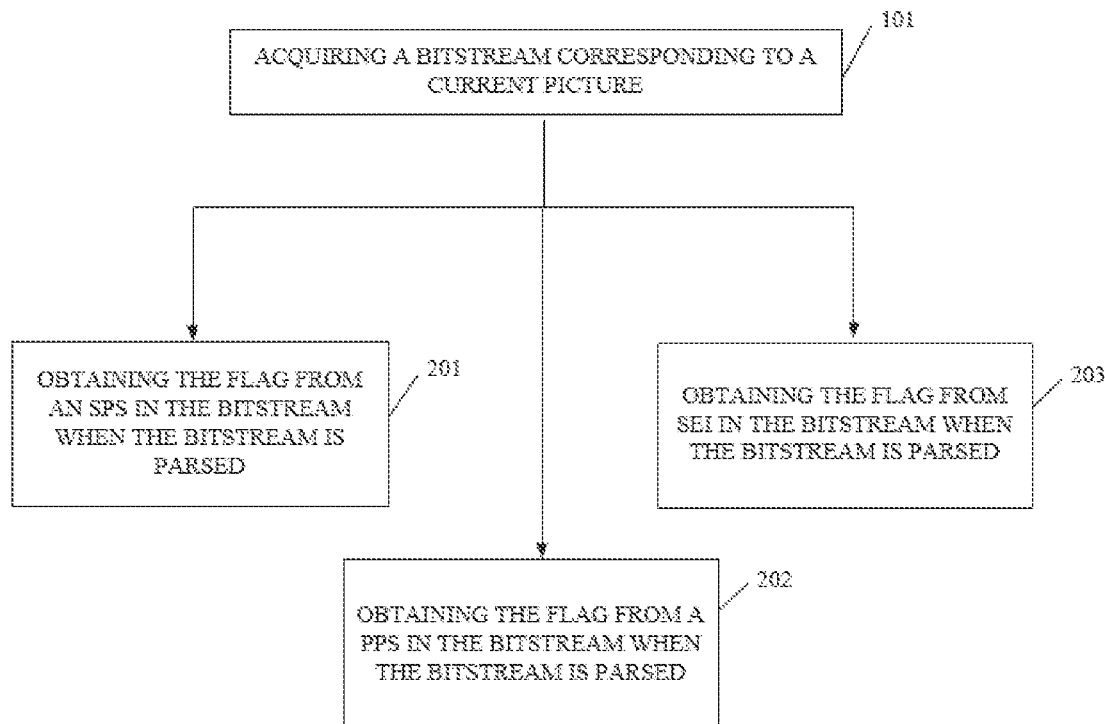
FIG. 6 is a fourth flowchart of a method for picture decoding according to implementations.

In at least one implementation, furthermore, FIG. 6 is a fourth flowchart of a method for picture decoding according to implementations. As illustrated in FIG. 6, for the method described in block 101 to block 105 above, the decoder parses the bitstream to obtain the flag corresponding to the current picture as follows.

At 201, the flag is obtained from an SPS in the bitstream when the bitstream is parsed.

In the implementation, after acquiring the bitstream corresponding to the current picture, the decoder can parse the bitstream to obtain the flag corresponding to the current picture from the SPS in the bitstream.

In the implementation, after the decoder parses the bitstream corresponding to the current picture, the flag obtained through parsing may be located in the SPS. In an example, since the SPS stores a set of global parameters of an encoded video sequence, if the decoder obtains the flag from the SPS in the bitstream, the flag can be applied to all pictures in the encoded video sequence.

Furthermore, in the implementation, if the decoder obtains the flag from the SPS, the decoder can decode all pictures in the encoded video sequence according to the flag. For example, if the decoding manner indicated by the flag is cross-decoding of colour components, the decoder can enable the cross-decoding function, to decode all pictures by using the dependency between different colour components, that is, decode all pictures through CCLM or DM.

At 202, the flag is obtained from a PPS in the bitstream when the bitstream is parsed.

In the implementation, after acquiring the bitstream corresponding to the current picture, the decoder can parse the bitstream to obtain the flag corresponding to the current picture from the PPS in the bitstream.

In the implementation, after the decoder parses the bitstream corresponding to the current picture, the flag obtained through parsing may be located in the PPS. In an example, since the PPS stores parameters on which encoded data of one picture depends, if the decoder obtains the flag from the PPS in the bitstream, the flag can be applied to one picture in the encoded video sequence which corresponds to the PPS.

Furthermore, in the implementation, if the decoder obtains the flag from the PPS, the decoder can decode, according to the flag, the picture in the encoded video sequence which corresponds to the PPS. For example, if the decoding manner indicated by the flag is cross-decoding of colour components, the decoder can enable the cross-decoding function, to decode the picture in the encoded video sequence which corresponds to the PPS by using the dependency between different colour components, that is, decode the picture in the encoded video sequence which corresponds to the PPS by means of CCLM or DM.

At 203, the flag is obtained from SEI in the bitstream when the bitstream is parsed.

In the implementation, after acquiring the bitstream corresponding to the current picture, the decoder can parse the bitstream to obtain the flag corresponding to the current picture from the SEI in the bitstream.

In the implementation, after the decoder parses the bitstream corresponding to the current picture, the flag obtained through parsing may be located in the SEI. In an example, since the SEI assists in decoding, which is used to add additional video information into the bitstream, if the decoder obtains the flag from the SEI in the bitstream, the flag can be applied to image information corresponding to the SEI in the encoded video sequence.

Furthermore, in the implementation, the flag obtained through parsing may be located in one or more of SPS, PPS, SEI, coding tree unit, and coding unit in the bitstream. Accordingly, when processing the current picture, the decoder can perform adaptive decoding on the corresponding picture information according to the specific position of the flag in the bitstream.

According to the method for picture decoding, the decoder acquires the bitstream corresponding to the current picture; the decoder parses the bitstream to obtain the flag corresponding to the current picture; the decoder disables the cross-decoding function when the decoding manner indicated by the flag is the independent decoding of colour components, where the cross-decoding function allows decoding based on the dependency between colour components. That is, according to the implementation, the decoder may first parse the bitstream corresponding to the current picture to obtain the flag in the bitstream for determining whether to allow dependency between colour components. If the decoding manner indicated by the flag is the independent decoding of colour components (that is, the dependency between colour components is not allowed), the decoder needs to disable the cross-decoding function (that is, the decoder decodes the current picture without relying on the dependency between colour components). As such, parallel coding can be achieved and complexity of coding can be reduced in scenes that require fast processing or high parallel processing.

Figure 7:
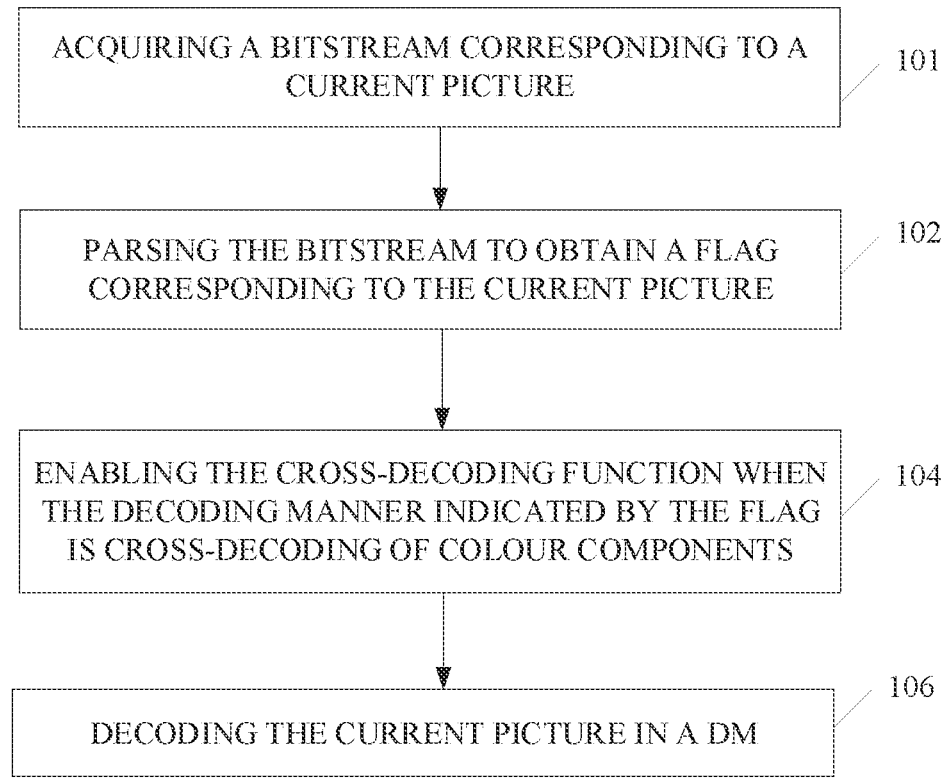
FIG. 7 is a fifth flowchart of a method for picture decoding according to implementations.

Based on the above implementation, in yet another implementation, furthermore, FIG. 7 is a fifth flowchart of a method for picture decoding according to implementations. As illustrated in FIG. 7, after the decoder enables the cross-decoding function when the decoding manner indicated by the flag is the cross-decoding of colour components (i.e., block 104), the decoder further conducts the following.

At block 106, the current picture is decoded in a DM.

In the implementation, if the decoding manner indicated by the flag is the cross-decoding of colour components, after enabling the cross-decoding function, the decoder can decode the current picture in the DM.

Furthermore, in the implementation, when implementing the prediction from the luma component to the chroma component through the DM, to reduce redundancy between the luma component and the chroma component and between different chroma components, in the joint exploration model (JEM) or VVC test model (VTM) of H.266/VVC, cross-component alternative representation of the prediction mode is used.

In the implementation, furthermore, after the decoder enables the cross-decoding function when the decoding manner indicated by the flag is the cross-decoding of colour components (i.e., block 104), the decoder can not only decode the current picture using CCLM or DM, but can also decode the current picture using any technology based on the dependency between colour components, which is not limited herein.

According to the method for picture decoding, the decoder acquires the bitstream corresponding to the current picture; the decoder parses the bitstream to obtain the flag corresponding to the current picture; the decoder disables the cross-decoding function when the decoding manner indicated by the flag is the independent decoding of colour components, where the cross-decoding function allows decoding based on the dependency between colour components. That is, according to the implementation, the decoder may first parse the bitstream corresponding to the current picture to obtain the flag in the bitstream for determining whether to allow dependency between colour components. If the decoding manner indicated by the flag is the independent decoding of colour components (that is, the dependency between colour components is not allowed), the decoder needs to disable the cross-decoding function (that is, the decoder decodes the current picture without relying on the dependency between colour components). As such, parallel coding can be achieved and complexity of coding can be reduced in scenes that require fast processing or high parallel processing.

Figure 8:
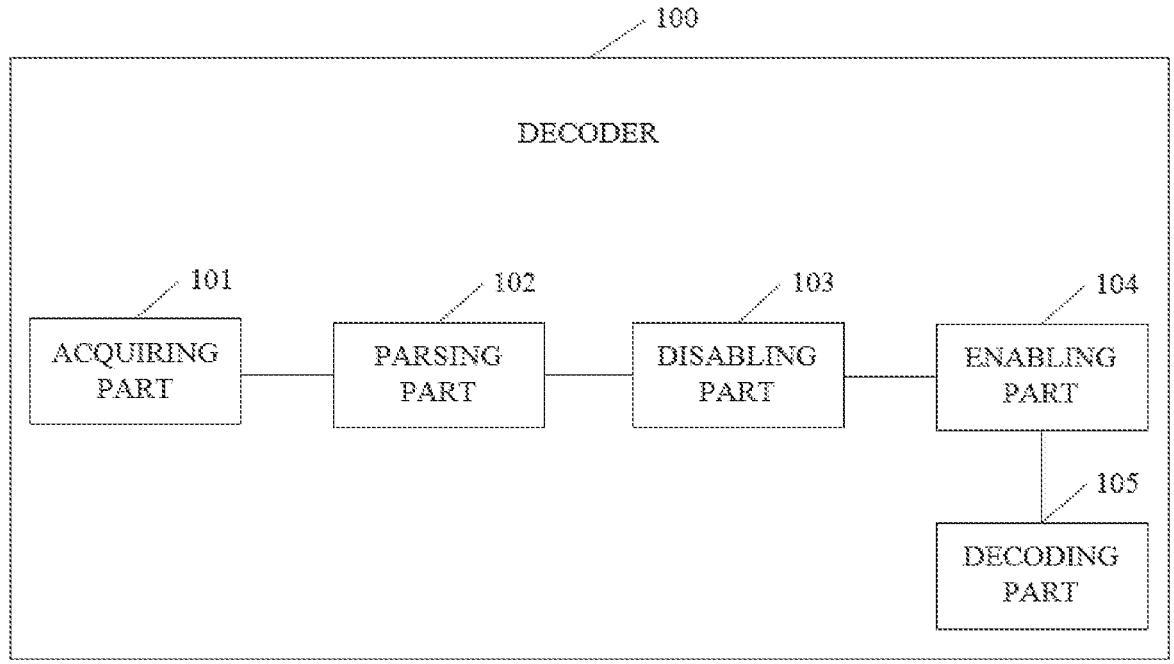
FIG. 8 is a first structural diagram of a decoder according to implementations.

Based on the above implementation, in still another implementation, FIG. 8 is a first structural diagram of a decoder according to implementations. As illustrated in FIG. 8, the decoder 100 of the implementation includes an acquiring part 101, a parsing part 102, a disabling part 103, an enabling part 104, and a decoding part 105.

The acquiring part 101 is configured to acquire a bitstream corresponding to a current picture.

The parsing part 102 is configured to parse the bitstream to obtain a flag corresponding to the current picture.

The disabling part 103 is configured to disable a cross-decoding function when a decoding manner indicated by the flag is independent decoding of colour components, where the cross-decoding function allows decoding based on dependency between colour components.

Furthermore, in at least one implementation, the enabling part 104 is configured to enable the cross-decoding function when the decoding manner indicated by the flag is cross-decoding of colour components, after parsing the bitstream to obtain the flag corresponding to the current picture.

Furthermore, in at least one implementation, the colour components include at least two of a first colour component, a second colour component, and a third colour component.

Furthermore, in at least one implementation, the decoding part 105 is further configured to decode the current picture according to a DM, after enabling the cross-decoding function when the decoding manner indicated by the flag is the cross-decoding of colour components.

Furthermore, in at least one implementation, the disabling part 103 is further configured to disable a DM when the decoding manner indicated by the flag is DM prohibited, after parsing the bitstream to obtain the flag corresponding to the current picture.

Furthermore, in at least one implementation, the parsing part 102 is configured to obtain from an SPS in the bitstream the flag when the bitstream is parsed.

Furthermore, in at least one implementation, the parsing part 102 is configured to obtain from a PPS in the bitstream the flag when the bitstream is parsed.

Furthermore, in at least one implementation, the parsing part 102 is configured to obtain from SEI in the bitstream the flag when the bitstream is parsed.

Figure 9:
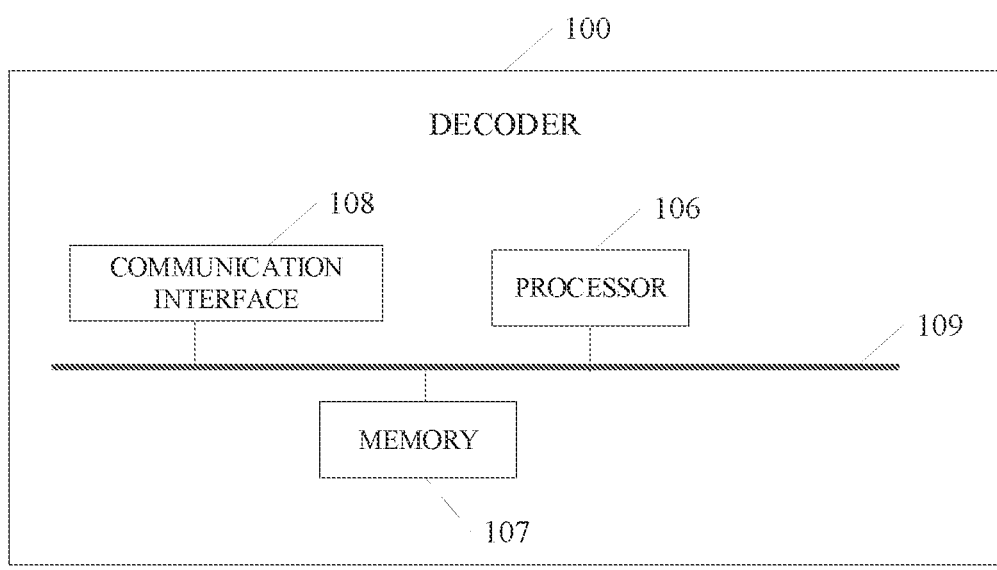
FIG. 9 is a second structural diagram of a decoder according to implementations.

FIG. 9 is a second structural diagram of a decoder according to implementations. As illustrated in FIG. 9, the decoder 100 of the implementation further includes a processor 106, a memory 107 storing instructions that can be executed by the processor 106, a communication interface 108, and a bus 109 for connecting the processor 106, the memory 107, and the communication interface 108.

In the implementation, the processor 106 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It is understandable that, for different devices, other electronic devices may be used to implement functions of the above-mentioned processor, which is not limited herein. The device 1 may further include the memory 107, and the memory 107 may be coupled with the processor 106. The memory 107 is used to store executable program codes, and the program codes include computer operation instructions. The memory 107 may include a high-speed random-access memory (RAM), and may also include a non-transitory memory, for example, at least two disk memories.

In the implementation, the bus 109 is configured to connect the communication interface 108, the processor 106, and the memory 107, and is configured for mutual communication among these devices.

In the implementation, the memory 107 is configured to store instructions and data.

Further, in the implementation, the processor 106 is configured to acquire a bitstream corresponding to a current picture; parse the bitstream to obtain a flag corresponding to the current picture; disable a cross-decoding function when a decoding manner indicated by the flag is independent decoding of colour components, where the cross-decoding function allows decoding based on dependency between colour components.

In practice, the memory 107 may be a volatile memory, such as a RAM, or may be a non-volatile memory, such as a read-only memory (ROM), a flash memory, a hard disk drive (HDD), or a solid-state drive (SSD), or may be a combination of the memories above, and is configured to provide instructions and data to the processor 106.

In addition, the functional units in the implementation may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a USB (universal serial bus) flash disk, a ROM, a RAM, a removable hard disk, disk, compact disc (CD), or the like.

According to the decoder of the implementation, the decoder acquires the bitstream corresponding to the current picture; the decoder parses the bitstream to obtain the flag corresponding to the current picture; the decoder disables the cross-decoding function when the decoding manner indicated by the flag is the independent decoding of colour components, where the cross-decoding function allows decoding based on the dependency between colour components. That is, according to the implementation, the decoder may first parse the bitstream corresponding to the current picture to obtain the flag in the bitstream for determining whether to allow dependency between colour components. If the decoding manner indicated by the flag is the independent decoding of colour components (that is, the dependency between colour components is not allowed), the decoder needs to disable the cross-decoding function (that is, the decoder decodes the current picture without relying on the dependency between colour components). As such, parallel coding can be achieved and complexity of coding can be reduced in scenes that require fast processing or high parallel processing. Meanwhile, in these scenes, a bit, which indicates that decoding is not based on the dependency between colour components, can be omitted in the CU layer and coding efficiency can be improved.

Figure 10:
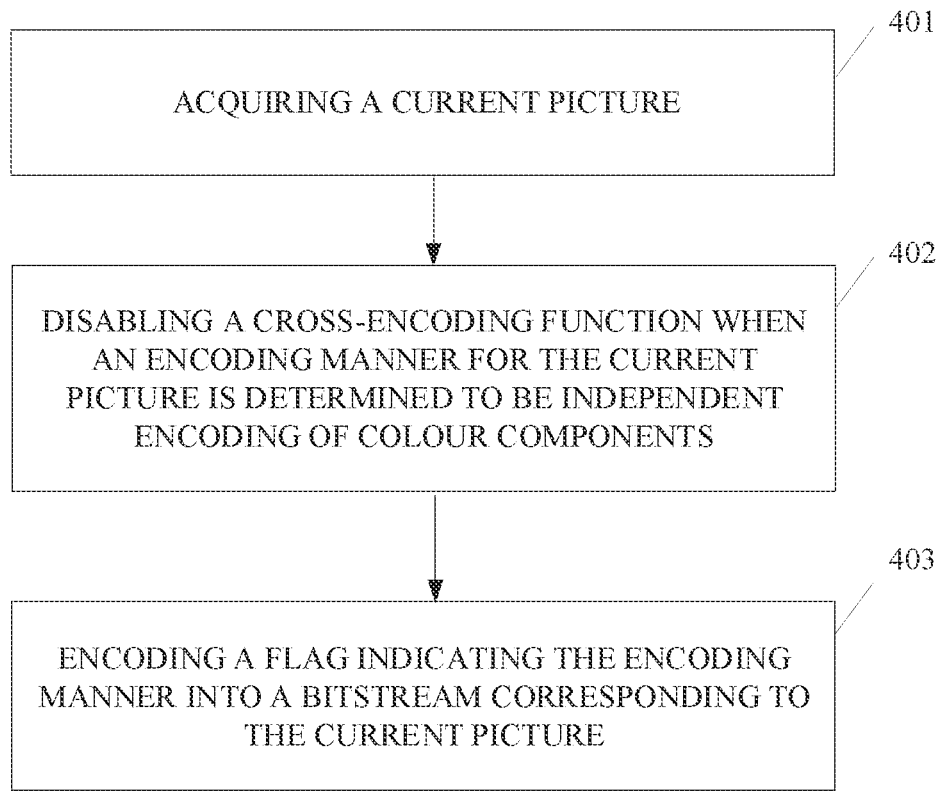
FIG. 10 is a flowchart of a method for picture encoding according to implementations.

Implementations of this application further provide a method for picture encoding. As illustrated in FIG. 10, the method begins at 401.

At 401, a current picture is acquired.

At 402, a cross-encoding function is disabled when an encoding manner for the current picture is determined to be independent encoding of colour components.

The cross-encoding function allows encoding based on dependency between colour components, for example, between two chroma components.

At 403, a flag indicating the encoding manner is encoded into a bitstream corresponding to the current picture.

Figure 11:
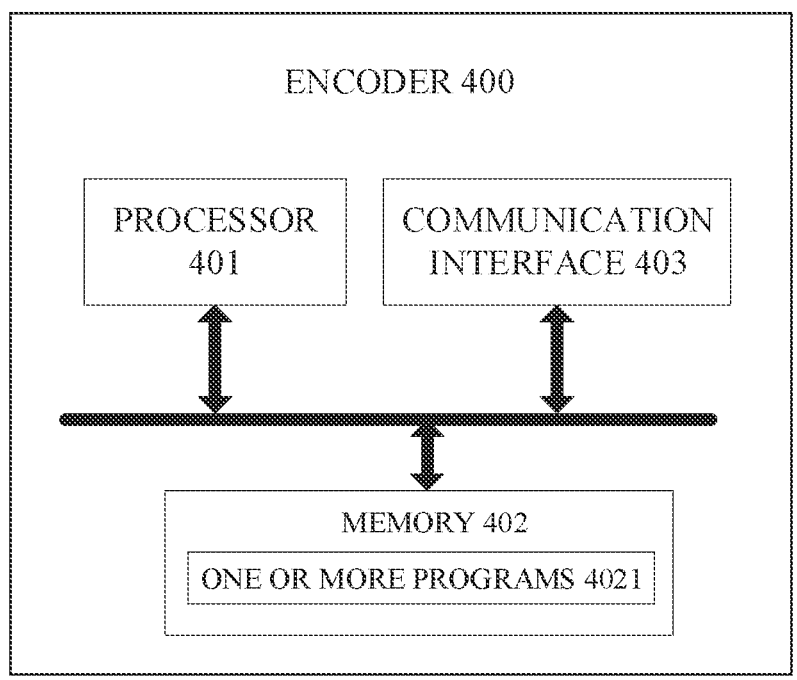
FIG. 11 is a structural diagram of an encoder according to implementations.

Implementations of this application further provide an encoder. As illustrated in FIG. 11, the encoder 400 includes a processor 401, a memory 402, and a communication interface 403. The memory 402 is coupled with the processor 401 and the communication interface 403 and configured to store at least one computer executable instruction (such as one or more programs 4021). When executed by the processor 401, the at least one computer executable instruction causes the processor 401 to execute the method for picture encoding.

Implementations of this application provide a computer readable storage medium. The computer readable storage medium stores programs thereon. When executed by a processor, the programs are configured to implement the method for picture decoding of the above.

In an example, program instructions corresponding to the method for picture decoding of the implementation can be stored in storage media such as an optical disk, a hard disk, and a USB flash disk. When the program instructions corresponding to the method for picture decoding in the storage medium are read or executed by an electronic device, they are used to implement the following.

A bitstream corresponding to a current picture is acquired. The bitstream is parsed to obtain a flag corresponding to the current picture. A cross-decoding function is disabled when a decoding manner corresponding to the flag is independent decoding of colour components, where the cross-decoding function allows decoding based on dependency between colour components.

Those skilled in the art will understand that implementations herein can provide a method, a system, or a computer program product. Therefore, the disclosure may have hardware-only implementations, software-only implementations, or software plus hardware implementations. In addition, the disclosure may be implemented in the form of a computer program product embodied on one or more computer usable storage media (including but not limited to a magnetic storage device, an optical memory, and the like) including computer usable program codes.

The disclosure is described herein with reference to schematic flowcharts and/or block diagrams of methods, apparatuses (systems), and computer program products according to the implementations of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flowchart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

The above are only some implementations of this application and is not used to limit the protection scope of this application.

INDUSTRIAL APPLICABILITY

The method for picture decoding, the decoder, and the computer storage medium are provided. The decoder acquires the bitstream corresponding to the current picture. The decoder parses the bitstream to obtain the flag corresponding to the current picture. The decoder disables the cross-decoding function when the decoding manner indicated by the flag is the independent decoding of colour components, where the cross-decoding function allows decoding based on the dependency between colour components. According to the implementations, the decoder may first parse the bitstream corresponding to the current picture to obtain the flag in the bitstream for determining whether to allow dependency between colour components. If the decoding manner indicated by the flag is the independent decoding of colour components (that is, the dependency between colour components is not allowed), the decoder needs to disable the cross-decoding function (that is, the decoder decodes the current picture without depending on the dependency between colour components). As such, parallel coding can be achieved and complexity of coding can be reduced in scenes that require fast processing or high parallel processing. Meanwhile, in these scenes, a bit, which indicates that decoding is not based on the dependency between colour components, can be omitted in the CU layer and coding efficiency can be improved.

What is claimed is:

1. A method for picture decoding, comprising:
   acquiring a bitstream corresponding to a current picture;
   parsing the bitstream to obtain a flag corresponding to the current picture;
   disabling a cross-decoding function when a decoding manner indicated by the flag is independent decoding of colour components, wherein the cross-decoding function allows decoding based on a dependency relationship between two chroma components; and
   enabling the cross-decoding function when the decoding manner indicated by the flag is cross-decoding of colour components; and
   after enabling the cross-decoding function when the decoding manner indicated by the flag is the cross-decoding of colour components,
   decoding the current picture in a direct mode (DM).

2. The method of claim 1, wherein parsing the bitstream to obtain the flag corresponding to the current picture comprises:
   obtaining the flag from a sequence parameter set (SPS) in the bitstream when the bitstream is parsed.

3. The method of claim 1, further comprising:
   after parsing the bitstream to obtain the flag corresponding to the current picture,
   disabling the DM when the decoding manner indicated by the flag is DM prohibited.

4. A method for picture encoding, comprising:
   acquiring a current picture;
   disabling a cross-encoding function when an encoding manner for the current picture is determined to be independent encoding of colour components, wherein the cross-encoding function allows encoding based on a dependency relationship between two chroma components;
   encoding a flag indicating the encoding manner into a bitstream corresponding to the current picture; and
   enabling the cross-encoding function when the encoding manner for the current picture is determined to be cross-encoding of colour components; and
   after enabling the cross-encoding function when the encoding manner for the current picture is determined to be cross-encoding of colour components,
   encoding the flag in a direct mode (DM).

5. The method of claim 4, wherein encoding the flag into the bitstream comprising:
   encoding the flag into a sequence parameter set (SPS) in the bitstream.

6. The method of claim 4, further comprising:
   after acquiring the current picture,
   disabling the DM when the encoding manner for the current picture is determined to be DM prohibited.

7. A decoder, comprising:
   at least one processor; and
   a memory, coupled to the at least one processor and storing at least one computer executable instruction which, when executed by the at least one processor, causes the at least one processor to:
   acquire a bitstream corresponding to a current picture;
   parse the bitstream to obtain a flag corresponding to the current picture;
   disable a cross-decoding function when a decoding manner indicated by the flag is independent decoding of colour components, wherein the cross-decoding function allows decoding based on a dependency relationship between two chroma components;
   enable the cross-decoding function when the decoding manner indicated by the flag is cross-decoding of colour components; and
   decode the current picture in a direct mode (DM).

8. The decoder of claim 7, wherein the at least one processor configured to parse the bitstream to obtain the flag corresponding to the current picture is configured to:
   obtain the flag from a sequence parameter set (SPS) in the bitstream when the bitstream is parsed.

9. The decoder of claim 7, wherein the at least one processor is further configured to:
   disable the DM when the decoding manner indicated by the flag is DM prohibited.

10. An encoder, comprising:
    at least one processor; and
    a memory, coupled to the at least one processor and storing at least one computer executable instruction thereon which, when executed by the at least one processor, causes the at least one processor to:
    acquire a current picture;
    disable a cross-encoding function when an encoding manner for the current picture is determined to be independent encoding of colour components, wherein the cross-encoding function allows encoding based on a dependency relationship between two chroma components;
    encode a flag indicating the encoding manner into a bitstream corresponding to the current picture;
    enable the cross-encoding function when the encoding manner is determined to be cross-encoding of colour components; and
    encode the flag in a direct mode (DM).

11. The encoder of claim 10, wherein the at least one processor configured to encode the flag into the bitstream is configured to:
    encode the flag into a sequence parameter set (SPS) in the bitstream.

12. The encoder of claim 10, wherein the at least one processor is further configured to:

disable the DM when the encoding manner for the current picture is determined to be DM prohibited.

\* \* \* \* \*